United States Patent [19]
Yoon

[11] Patent Number: 5,977,723
[45] Date of Patent: Nov. 2, 1999

[54] BALLAST CIRCUIT FOR FLUORESCENT LAMP

[75] Inventor: Bong-eun Yoon, Pusen, Rep. of Korea

[73] Assignee: Samsung Display Devices Co., Ltd., Kyungki-do, Rep. of Korea

[21] Appl. No.: 08/768,729

[22] Filed: Dec. 18, 1996

[30] Foreign Application Priority Data

Dec. 26, 1995 [KR] Rep. of Korea ............... 95-56920

[51] Int. Cl.⁶ .................................................. H05B 37/02
[52] U.S. Cl. .................................. 315/247; 315/DIG. 5; 315/DIG. 7; 315/209 R
[58] Field of Search ................................ 315/247, 209 R, 315/DIG. 7, DIG. 5, 291, 224

[56] References Cited

U.S. PATENT DOCUMENTS 4,647,817 3/1987 Fähnrich et al. ................... 315/104
5,223,767 6/1993 Kulka ................................. 315/209 R

FOREIGN PATENT DOCUMENTS 0599405 6/1994 European Pat. Off. .
0606664 7/1994 European Pat. Off. .

*Primary Examiner*—Arnold Kinkead
*Attorney, Agent, or Firm*—Leydig, Voit & Mayer, Ltd.

[57] ABSTRACT

A ballast circuit for a fluorescent lamp for starting the fluorescent lamp and a compact fluorescent lamp is provided. The ballast circuit adopts a bypass capacitor which bypasses a high frequency and high harmonics to a smoothing portion for compensating a recovery characteristic of a rectification diode which causes a problem by feeding back high frequency currents (most of them are $I_L$) which flow during the ignition of a lamp to a power source input, and including a high frequency component much included in a rectifying and smoothing operation. Thus, a power factor increases 95% or more.

13 Claims, 7 Drawing Sheets

BALLAST CIRCUIT FOR FLUORESCENT LAMP

BACKGROUND OF THE INVENTION

The present invention relates to a ballast circuit for a fluorescent lamp, and more particularly, to a ballast circuit for starting either a fluorescent lamp (FL) or a compact fluorescent lamp (CFL).

FIG. 1 schematically illustrates a ballast circuit for a fluorescent lamp recited in U.S. Pat. No. 4,647,817. In FIG. 1, the lamp shown is 15W CFL. The operating frequency applied to the lamp of the ballast circuit is 45 KHz. A 220V, 50 Hz or 110V 60 Hz power supply is connected to terminals 2 and 3 to power the lamp 1. The input voltage $U_N$ is connected to a filter 4. Then, the filtered alternating voltage is provided to a rectifier 5 for rectification. The rectified voltage is smoothed by a capacitor 6. The filtered and smoothed voltage is applied to an inverter INV which comprises two transistors 7 and 8 having emitter resistors 9 and 10, respectively, and an inverter controlling circuit 11. The inverter INV is the essential element in this operating device.

The controlling voltage for the inverter is obtained from a transformer 12 having a primary coil 13 of only several windings. The primary coil winding 13 is connected to an operating circuit of the lamp 1.

The inverter INV basically generates a rectangular wave voltage, which is applied to the lamp 1 through an inductor 14 and a blocking capacitor 15 in the operating circuit. The blocking capacitor 15 blocks direct current (DC) from the lamp and forms a resonance circuit portion with the inductor 14. For operation at 45 KHz, the inductor 14 has an inductance of about 3 mH and the blocking capacitor 15 has a capacitance of about 47 nF.

The ignition and starting circuit ST is connected in parallel to the lamp 1 and serially with the electrodes 16 and 17 thereof, which comprises a parallel circuit of a limiting capacitor 19 and a positive temperature coefficient (PTC) resistor 20 and a starting capacitor 18. In the above circuit, the capacitance of the starting capacitor 18 is about 3.3 nF. A series circuit of the capacitors 18 and 19 form a coupled resonance capacitor $C_R$. A resistor, C890, manufactured by Siemens is used as the PCT resistor 20.

FIG. 2 is a ballast circuit for a fluorescent lamp recited in U.S. Pat. No. 5,223,767. In FIG. 2, a pair of terminals 21 and 22 of an EMI filter 25 comprising a first capacitor 9 and a first inductor 26, are supplied with a low frequency AC power source, i.e., 120V, 60 Hz. The output of the EMI filter 25 is connected to terminals 23 and 24 of a voltage multiplier circuit 28 through a second inductor 27 and a second capacitor 10. The first and second inductors 26 and 27 are connected in series between the AC input terminal 22 and an input terminal 24 of the voltage multiplier circuit 28. The first capacitor 9 is combined to both ends of the input terminals 21 and 22 and the second capacitor 10 is connected between the terminal 1 and a node of the inductors 26 and 27. The voltage multiplier circuit 28 having a pair of diodes 31 and 32 are connected in series to both ends of DC input terminals 33 and 34 of a high frequency DC/AC half bridge inverter 35. Buffer capacitors 36 and 37 connected in series are combined parallel to the diodes connected in series. A pair of switching transistors 38 and 39 are connected in series and arc combined to the DC power source terminals 33 and 14. Third and fourth diodes 57 and 58 arc combined to the far ends of the transistors 38 and 39, respectively. One end of a discharge lamp 40 (for example, the fluorescent lamp) is combined to a connection point 23 between the diodes 31 and 32 through a capacitor 41 and the other end of the discharge lamp 40 is connected to a connection point 42 between the switching transistors 38 and 39 through an inductor 43. This connection is indicated as a dashed line in the drawing. However, according to the present invention, in the circuit constituted of the first arid second inductors 44 and 45 instead of the single inductor 43, the common node between the first and second inductors 44 and 45 is connected to the DC input terminal 34 through a capacitor 46.

Electrodes of the discharge lamp 47 and 48 are connected parallel to a PTC resistor 49 and a capacitor 50 which are connected in series. The PTC resistor 49 provides a path through which a pre-heating current for heating the electrodes of the lamp flows before igniting the lamp. A buffer capacitor 52 operates so as to connect the node 42 to a node 53 to reduce loss of power in the switching transistors 38 and 39.

A conventional control circuit 54 operates the switching transistors 38 and 39 in an alternating ON/OFF manner in which when one transistor is turned on, the other transistor is turned off. The control circuit, driven by an IC, however, can be constituted by a transformer having first and second windings, respectively combined to the windings connected in series such as the inductors 44 and 45, the base and the emitter of the switching transistor, as a load circuit connected between the node 42 and the node 53. A magnetic oscillation high frequency DC/AC converter can be obtained since the second winding can be connected in series to the base of the transistor in this way in the respective resistors. Since the exact driving method of the switching transistor is not limited to this method and various driving methods can be used, a desirable operation of the circuit is performed.

The lamp 40, the capacitor 51, the inductors 44 and 45, and the capacitor 46 in essence constitute a resonant circuit which makes the half bridge inverter perform oscillation at high frequency.

A starting circuit 55 is provided to start the operation of a high frequency inverter 35.

The input current from the AC power source provides a high frequency path for supplying resonance power to a capacitor 41 and the lamp circuit and returns the same to the electrolytic buffer capacitors 36 and 37. Therefore, the capacitor 30 and the inductor 27 which make the voltages of the respective ends of the two capacitors higher than the voltage between the lines of the AC power source terminals 21 and 22 are part of the multiplier voltage circuit 28. The energy which returns from the resonance circuit through the capacitor 41 brings about the voltage generation of both ends of the inductor 27. This voltage is added to the voltage between the AC lines and generates a voltage which is higher than the buffer capacitor voltage, however, is clamped to the buffer capacitor voltage by the respective diodes 31 and 32. Therefore, power returns to the buffer capacitor through the diodes 31 and 32. The additional voltage boosting operation of the buffer capacitors 36 and 31 is provided by an LC resonant circuit comprised of the inductor 45 arid the capacitor 46. By using the LC resonant circuit instead of a single inductor such as the inductor 43, the feedback voltage supplied to the capacitors 36 and 37, namely, a partial voltage derived from the capacitor 41 and another partial voltage derived from the LC resonant circuits 44, 45, and 46, is effectively divided.

The diodes 57 and 58 provide a path through which power is returned to the buffer capacitor. In the case that the transformer is used in driving the transistors 38 and 39, the diodes 57 and 58 can be removed since the second winding and the collector-base connection of the transistors provide a low impedance path for returning the energy to the capacitor.

The collector-base connection of the transistor provides the function of the diodes. Furthermore, the boosting operation is provided by the inductor 27 which operates as a voltage source which moves electrical currents to the capacitors 36 and 37 through the classification diodes 31 and 32.

In another embodiment of the circuit, a capacitor 56 can be connected between the node 53 and the input terminal 54. The half bridge inverter circuit will operate like the high frequency boosting converter which boosts the respective voltages of the buffer capacitors 36 and 37 to more than a peak line voltage by an appropriate selection of the capacitors 41 and 56, thereby providing the circuit with a high power factor and low harmonic line current. Thus, the circuit draws much less current due to the improved power factor.

As described above, since the input ripple currents to the capacitors 36 and 37 are not totally derived from the AC power source of low frequency (60 Hz) and are partially derived from the half bridge circuit of high frequency, lower capacitors can be used, and moreover, can maintain a low ripple voltage.

However, in the ballast circuit of FIG. 1, the waveform the capacitors 36 and 37 are not totally derived from the AC power source of low frequency (60 Hz) and are partially derived from the half bridge circuit of high frequency, smaller capacitors can be used, and moreover, can maintain a low ripple voltage.

However, in the ballast circuit of FIG. 1, the waveform of the power source voltage output from the circuit, as shown in FIG. 3(c) compared to the power source voltage, shown in FIG. 3(a) is distorted by the current flows shown in FIG. 3(b). That is, the total harmonic distortion (THD) is about 140~370%, thereby generating a current wave form having a high current harmonic noise and generating much distortion in the waveform of the output voltage. This causes the change in a reference power source voltage. Also, the power factor is low, i.e., approximately 50~60%.

Also, the ballast circuit for the fluorescent lamp shown in FIG. 2 can be used with a power source of about AC 110V by adopting a voltage multiplier to the input power source. However, in the case that a power source voltage of AC 220V~230V is input, since 220V×2√2(=616V) is output when performing double voltage amplification, the circuit device cost gets higher, namely, an electrolytic capacitor and a power transistor which can withstand high voltages or FET must be used. Also, the power factor is deteriorated by the inductor 27 which is used for boosting.

SUMMARY OF THE INVENTION

It is an object of the present invention to provide a ballast circuit for a fluorescent lamp that exhibits low total harmonic distortion and an improved power factor.

To accomplish the above object of the present invention, there is provided a ballast circuit for a fluorescent lamp which has a discharge tube having two heatable electrodes separated from each other, the ballast circuit comprising: rectifying means for rectifying an applied AC voltage; inverting means for generating a rectangular wave voltage for driving said discharge tube using a constant voltage output from the rectifying means; starting means for starting the discharge tube using said rectangular wave voltage; and a bypass capacitor for supplying higher harmonics and high frequency current which flow through the electrodes of the started discharge tube to the AC power source.

Here, the rectifying means is a bridge rectifying circuit comprising four bridge diodes and an electrolytic capacitor for smoothing a voltage full-wave rectified by the bridge diodes. Also, the ballast circuit further comprises an LC resonant circuit in which a choke coil changing the rectangular wave voltage into a sinusoidal voltage and a capacitor are connected in series between the inverting means and one of the electrodes of the discharge tube.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 4:
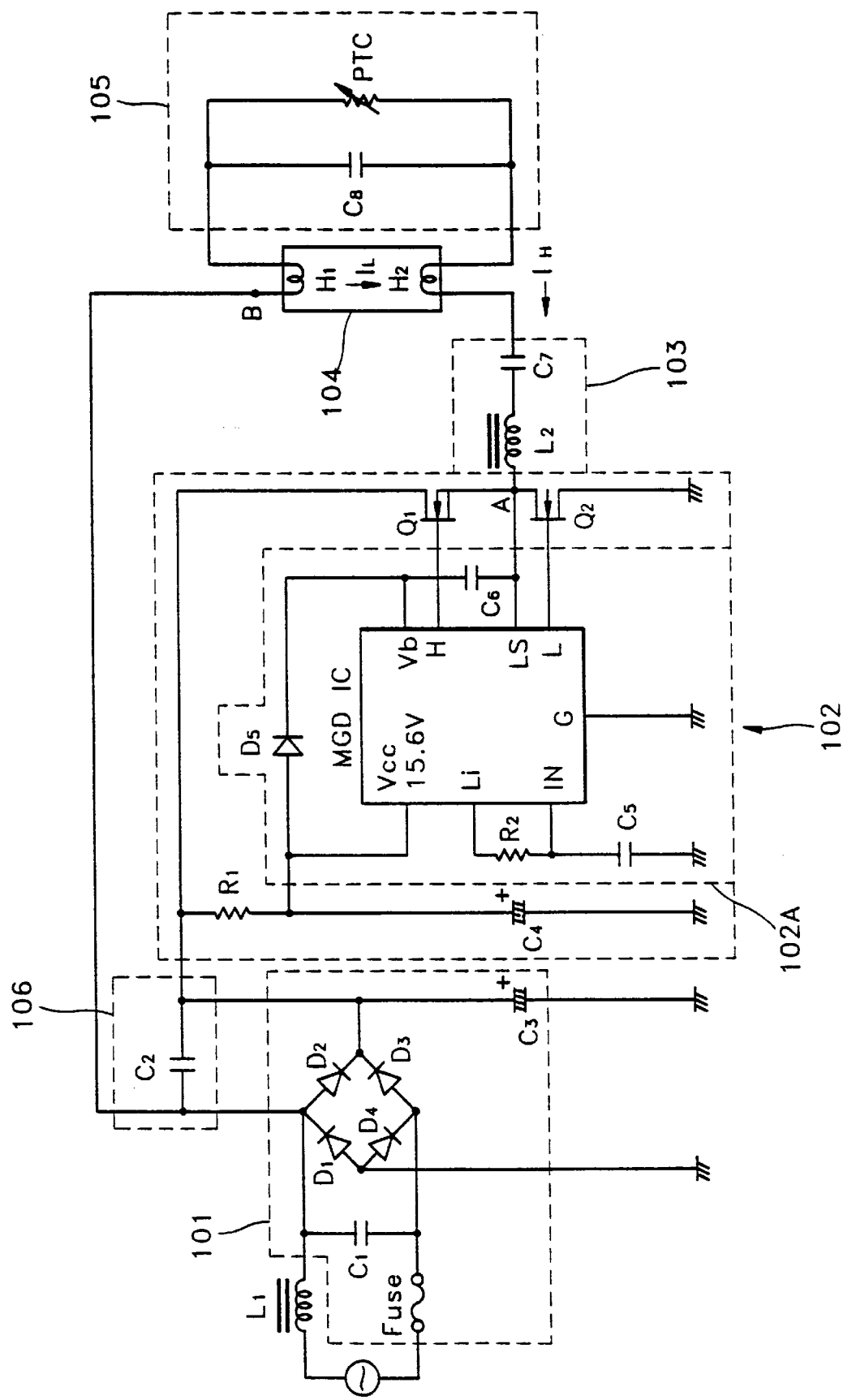
FIG. 4 is a ballast circuit according to the present invention.

The ballast circuit shown in FIG. 4 comprises a bridge rectifier 101 which rectifies an AC supply voltage into a DC voltage, an inverter 102 which generates rectangular wave voltages for driving a fluorescent lamp using the voltage rectified in the bridge rectifier 101, an LC resonant circuit 103 which selectively passes only the pulse voltage generated in the inverter 102 to a fluorescent lamp tube 104, a starting circuit 105 for starting the fluorescent lamp tube 104, and a bypass capacitor ($C_2$) 106 which feeds back both high frequency and higher harmonic current generated by driving the fluorescent lamp, to a smoothing capacitor $C_3$.

In the bridge rectifier 101, EMI filters $C_1$ and $L_1$ protect the bridge diodes to remove the impulse component included in the AC supply voltage. $C_1$ which is connected in parallel to the AC power source passes only the impulse component and $L_1$ which is connected in series to the AC power source blocks only the impulse component and doubly protects the bridge diodes. The rectifying bridge diodes $D_1$–$D_4$ perform a full-wave rectification. The smoothing capacitor $C_3$ smooths the ripple components of the voltage full-wave rectified by the bridge diodes to obtain a constant voltage.

The inverter 102 is mainly comprised of an oscillating portion 102A and two switching transistors $Q_1$ and $Q_2$. There are also a resistor $R_1$ as a path for supplying the voltage formed by the bridge rectifier 101 to the oscillator MGD IC for appropriately lowering the voltage and an electrolytic capacitor $C_4$ for stabilizing the voltage supplied to the oscillating portion 102A through $R_1$. The oscillating portion 102A comprises an MOS gate driver (MGD) and a plurality of passive devices. Here, the MGD is the IC which generates an oscillating signal for driving the two switching transistors $Q_1$ and $Q_2$ using the constant voltage applied through $R_1$. A diode $D_5$ for stabilizing an oscillation output for stably supplying a terminal voltage $V_{cc}$ for driving the MGD to a voltage $V_b$ terminal for supplying the voltage for oscillation output of the MGD has a temperature compensation effect. $C_6$ is a capacitor for stabilizing the voltage supplied to the voltage $V_b$ terminal. The voltage supplied to $V_b$ is the voltage supplied by $V_{cc}$ through $D_5$. $R_2$ and $C_5$ are a resistor and a capacitor, respectively, for determining the oscillation frequency. The frequency is determined by a time constant $\tau=1.4R_2C_5C$. The two switching transistors $Q_1$ and $Q_2$ are respectively sequentially driven by the voltages of the oscillation waveforms shown in FIGS. 5(*a*) and 5(*b*).

The LC resonant circuit 103 comprises $L_2$ and $C_7$, which are combined in series and supply the rectangular wave voltage after changing the same into a sinusoidal voltage required by the lamp. The fluorescent lamp 104 is comprised of the two electrodes $H_1$ and $H_2$ spaced from each other.

The fluorescent lamp starting circuit 105 is connected in series to the two electrodes of the discharge tube 104 and comprises a starting capacitor C and a positive thermal coefficient (PTC) resistor which are connected parallel to each other. The starting capacitor $C_8$ determines the voltage level supplied to the fluorescent lamp in the operation of the fluorescent lamp. The resistance of the positive thermal coefficient resistor increases as the temperature rises according to the increased current through the fluorescent lamp.

The bypass capacitor ($C_2$) 106 reduces the generation of heat in $D_2$ by making the high frequency component of the current flowing through the electrodes according to the operation of the lamp bypass the rectification diode $D_2$ and be fedback to the power source input terminal, that is, the smoothing capacitor $C_3$. Namely, the high frequency currents flowing through the electrodes and compounded by the currents having a 120 KHz rectification frequency of the bridge rectifier 101 are rectified in the bridge rectifier 101, and are smoothed in the smoothing capacitor $C_4$. Therefore, heat is generated in the diode since the compounded currents which are rectified are of high frequency. This is because much heat is generated by the high frequency currents since it is the characteristic of the rectifying diode to have a long recovery time. To solve such a problem, it is possible to prevent thermal loss of the diode by connecting the bypass capacitor ($C_2$) 106 parallel to the diode $D_2$, bypassing the same to the buffer capacitor having the high frequency currents including the higher harmonic component, and smoothing the same in the smoothing capacitor. Namely, stable rectification is attained by bypassing a part of the high frequency component to the smoothing capacitor using the frequency characteristic of the capacitor. At this time, the smoothing capacitor operates as the high frequency boosting converter since the high frequency currents are applied and smoothed therein. The charge having the high capacitance flows between the lines as the voltage source, thereby improving the power factor and reducing the "line current higher harmonics," Therefore, the input port consumes far less input current by improving the power factor.

The operation of the ballast circuit described above is as follows.

Figure 5A:
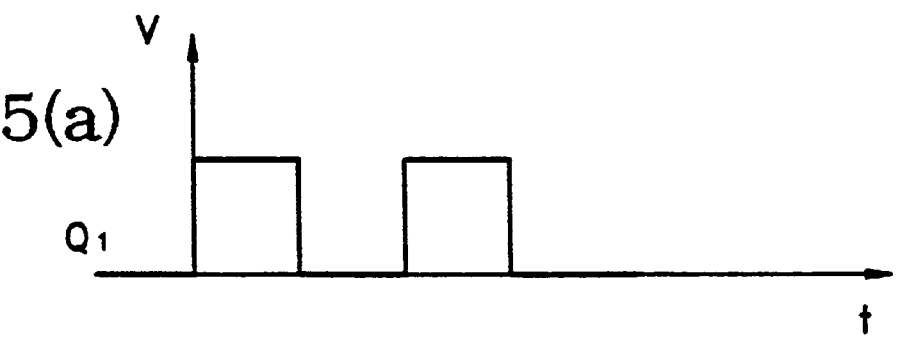
FIGS. 5(a), and 5(b) show waveforms of the output voltages of the oscillating portion in the ballast circuit of FIG. 4.
Figure 5B:
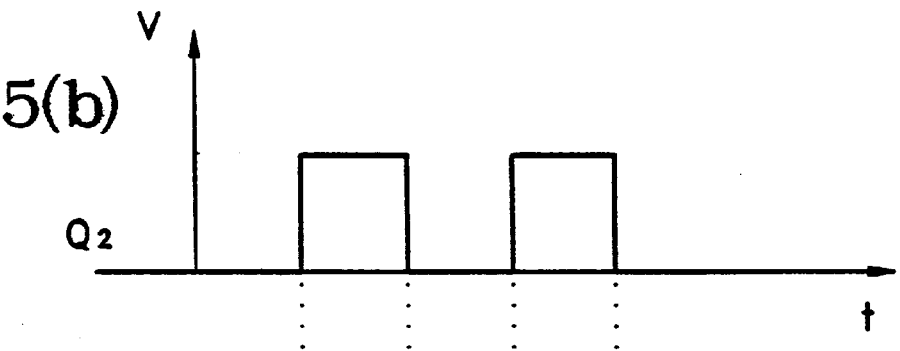

The rectangular wave voltage signal for driving the fluorescent lamp is generated in the inverter 102 using the voltage rectified in the bridge rectifier 101. Namely, when a stable constant voltage is supplied to the $V_{cc}$ terminal of the MGD IC through the resistor $R_1$, the MGD IC drives the two switching transistors $Q_1$ and $Q_2$ by operating other passive devices and generating an oscillating signal. At this time, the diode $D_5$ for stabilizing the oscillation output stably supplies the $V_{cc}$ terminal voltage for driving the MGD IC to the $V_b$ terminal for supplying the voltage for outputting the MGD IC considering the temperature change of the IC. The capacitor C, delays the oscillation output. The oscillating frequency is determined by the time constant $\tau=R_2C_5$ of $R_2$ and $C_5$. Therefore, the two switching transistors Q1 and Q2 are sequentially driven by the voltage having the oscillating waveforms as shown in FIGS. 5(*a*) and 5(*b*) and generate the signal for driving the lamp having the rectangular wave of 30~50 KHz.

Only the 30~50 KHz pulse voltage generated in the inverter 102 selectively passes through the LC resonant circuit 103 constituted by $L_2$ and $C_7$ and drives the heaters $H_1$ and $H_2$ of the discharge tube 104. At this time, the starting circuit 105 constituted by the starting capacitor $C_8$ and the positive thermal coefficient resistor starts the discharge tube 104. The starting capacitor $C_8$ which determines the level of the voltage supplied to the discharge tube during the operation of the discharge tube is effectively shorted by the PTC resistor connected parallel when the voltage is low. Therefore, the currents flowing through the heaters $H_1$ and $H_2$ of the discharge tube 104 are considerably high. As the temperature of the discharge tube rises due to the large heater currents $I_H$, the PTC resistor value gets higher, thereby interrupting the short circuit and operating the starting capacitor $C_8$ more effectively. Thus, it becomes possible to obtain the desired voltage for driving the lamp.

Figure 6A:
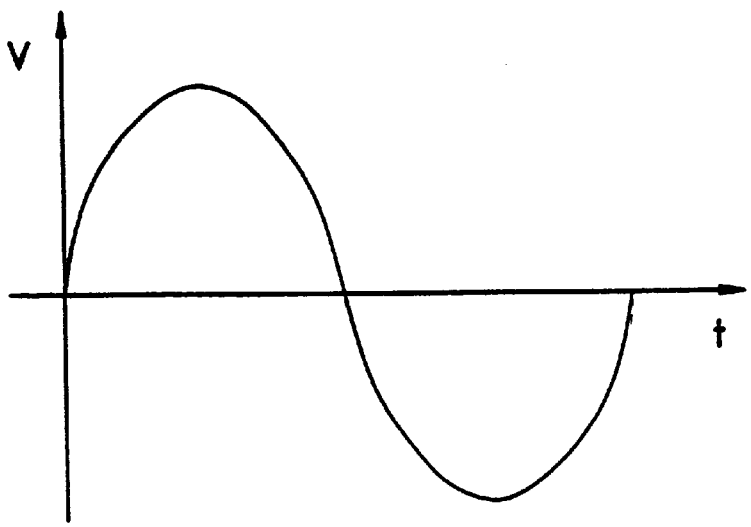
FIGS. 6(a), 6(b), and 6(c) show waveforms of the output voltages of the ballast circuit of FIG. 4.
Figure 6B:
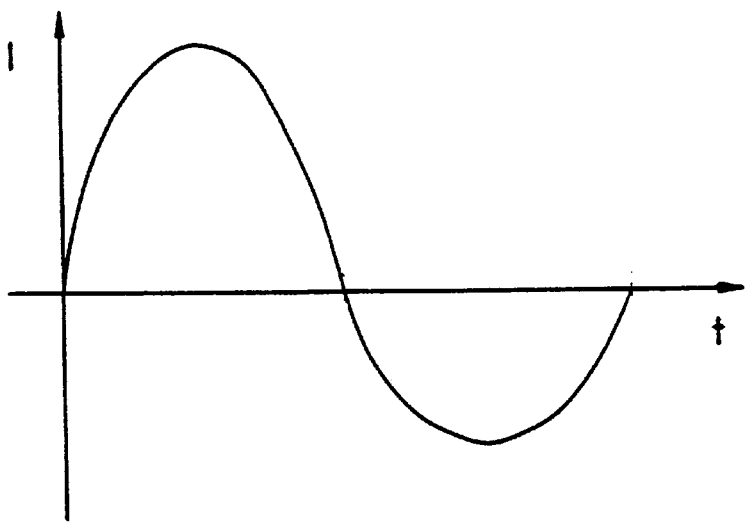
Figure 6C:
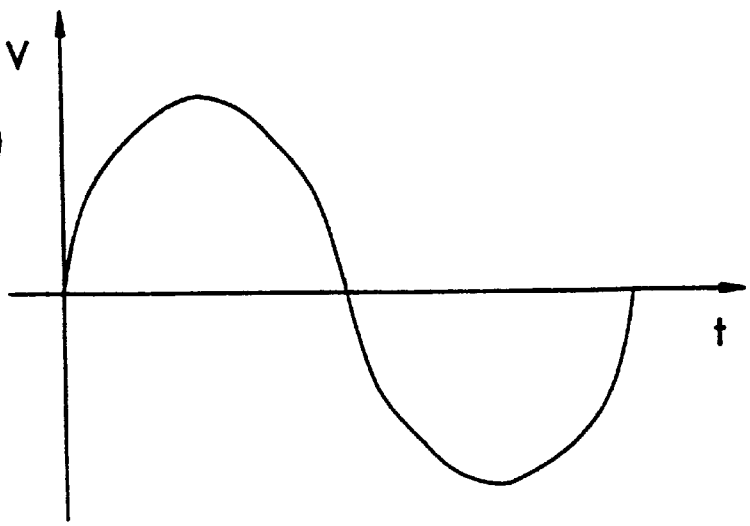
Figure 7:
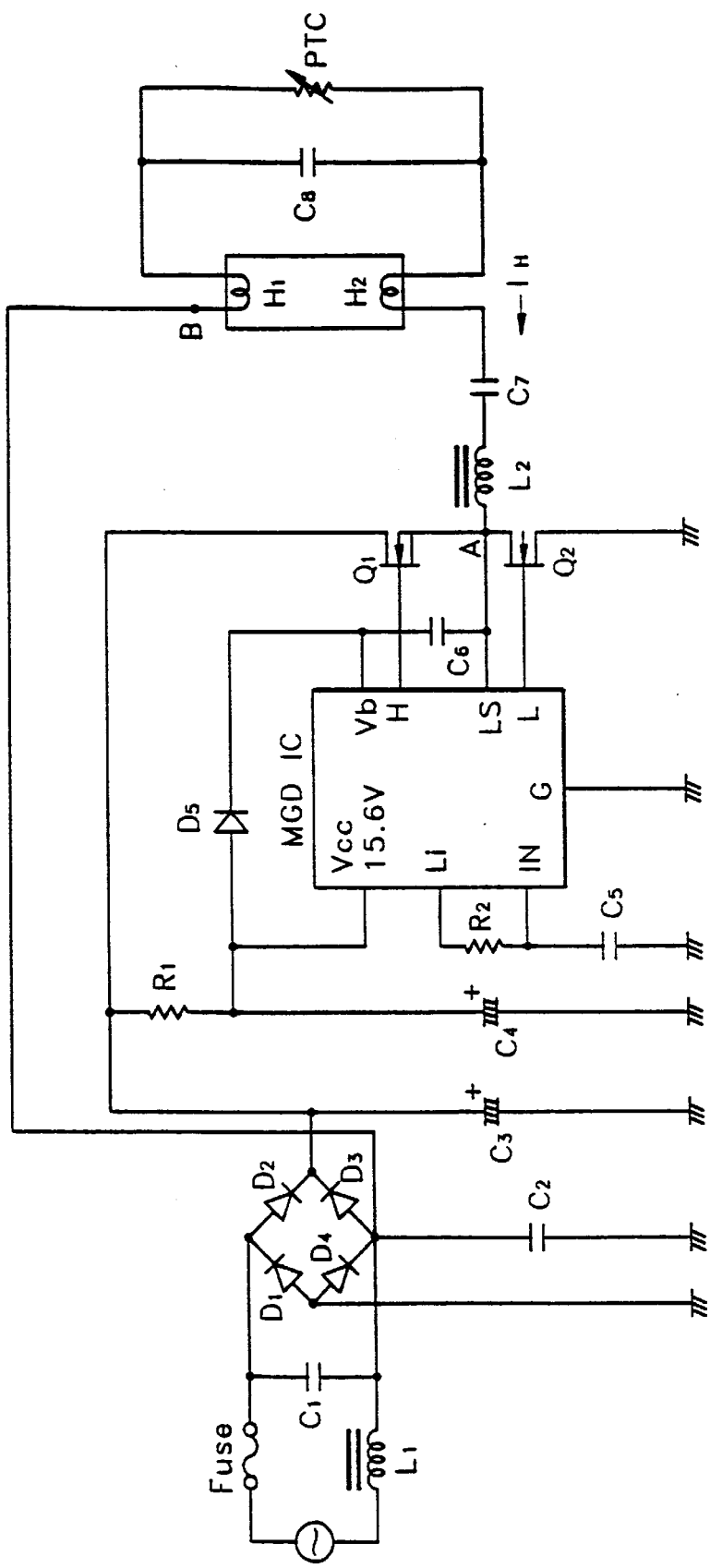
FIG. 7 shows a circuit in which the position of connection of a bypass capacitor is changed in the ballast circuit of FIG. 4.

However, much of the higher harmonic component is retained in the currents $I_H$ which flow through the heaters during the driving of the lamp, thereby exerting an influence on the waveform of the constant voltage and distorting the same, which is prevented by the bypass capacitor ($C_2$) 106. The bypass capacitor 106 prevents current distortion and improves the power factor as shown in FIGS. 6(*a*), 6(*b*), and 6(*c*) by feeding back the higher harmonic component of the currents $I_L$ of the discharge tube which is transmitted to the bridge rectifier 101 through the switching transistors $Q_1$ and $Q_2$ to the AC power source. By doing so, the THD decreases to below 20% and the power factor increases to over 95% as shown in the following table 1, which fully satisfies the IEC (International Electrical Code) standard.

TABLE 1

Figure 1:
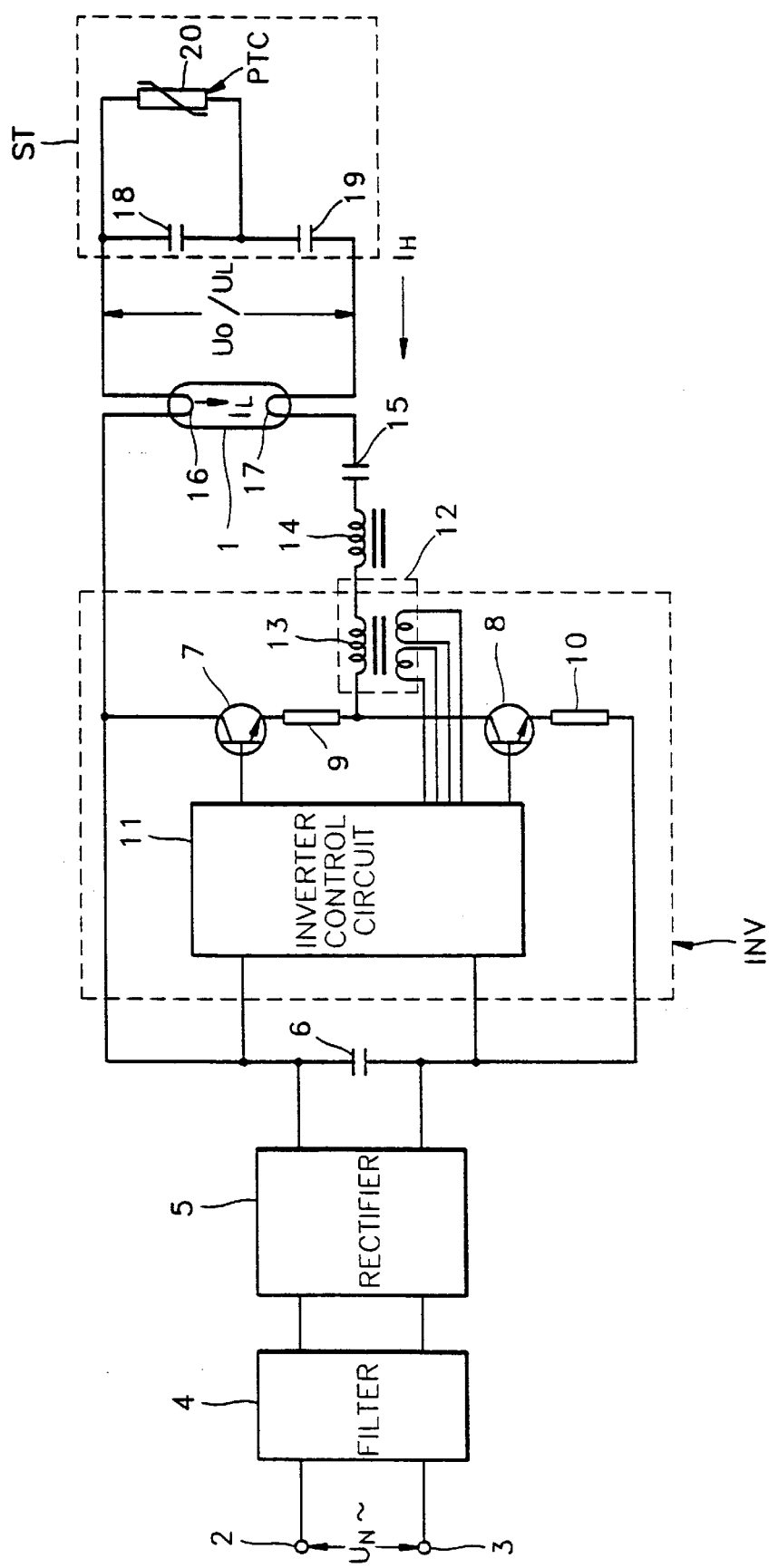
FIG. 1 shows a conventional ballast circuit for a fluorescent lamp.

|  | Conventional circuit 1 (FIG. 1) | Conventional circuit 2 (FIG. 2) | Circuit of the present invention | IEC standard |
| --- | --- | --- | --- | --- |
| Total harmonic distortion | 150 | 25 | 18 | 20% or below |
| Power factor | 0.60 | 0.95 | 0.96 | 90% or above |

TABLE 1-continued

|  | Conventional circuit 1 (FIG. 1) | Conventional circuit 2 (FIG. 2) | Circuit of the present invention | IEC standard |
| --- | --- | --- | --- | --- |
| Consumed current (at 220V) | 156 mA | 98 mA | 95 mA |  |

Figure 2:
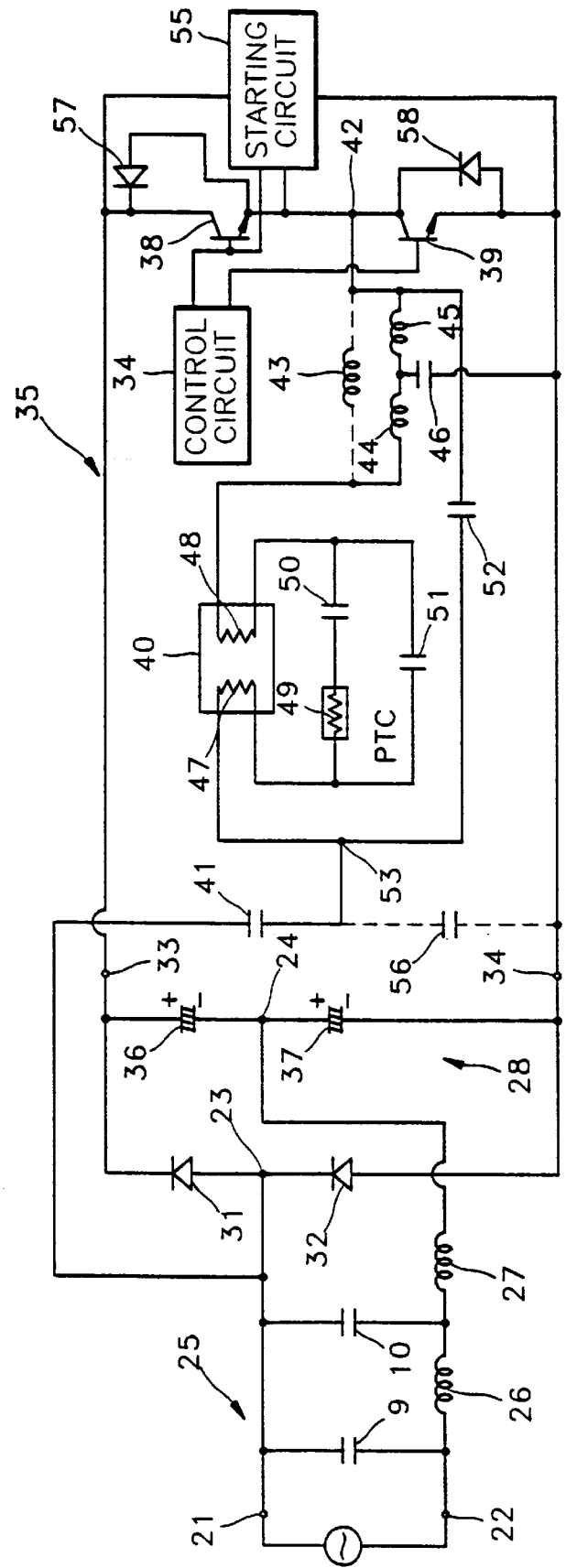
FIG. 2 shows another conventional ballast circuit for a fluorescent lamp.
Figure 3A:
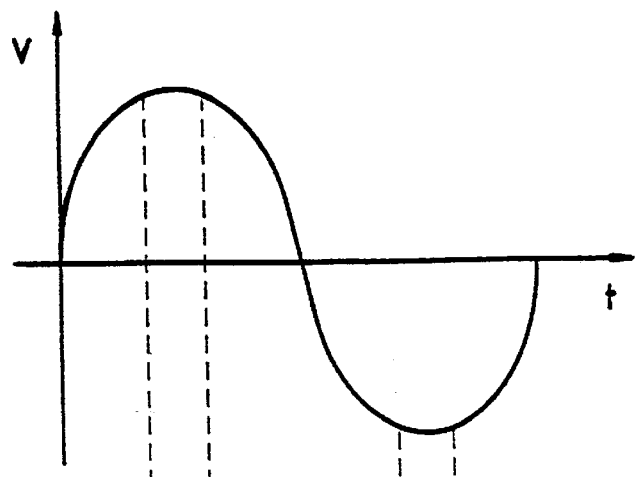
FIGS. 3(a), 3(b), and 3(c) show waveforms of the respective voltages of the ballast circuit of FIG. 1.
Figure 3B:
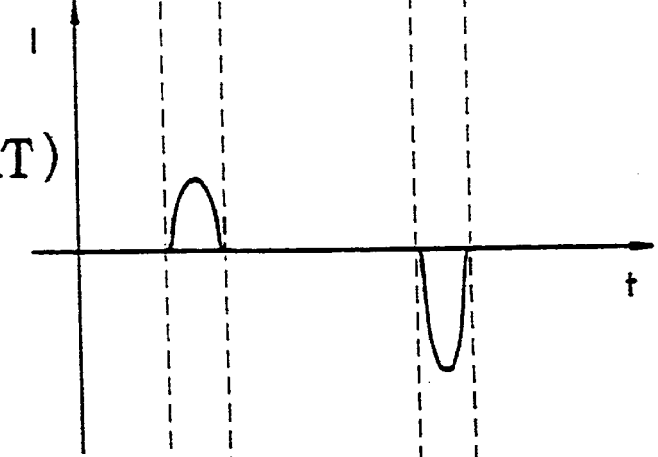
Figure 3C:
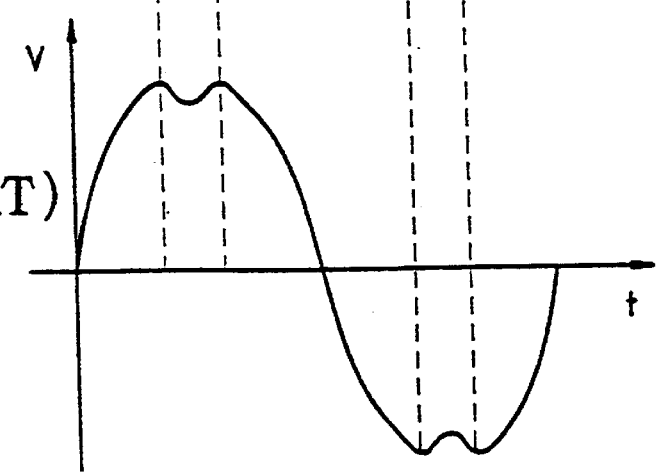

Also, in an embodiment of the present invention, the electrolytic capacitor for smoothing and the power transistor which can withstand a high voltage are not required since the rectification voltage is maintained about 300~550V using the bridge rectification circuit and the manufacturing expense is inexpensive since the inductor 27 for boosting the ballast circuit as shown in FIG. 2 is not required.

What is claimed is:

1. A ballast circuit for a fluorescent lamp including a discharge tube having two heatable electrodes separated from each other, said circuit comprising:

rectifying means for rectifying an applied AC voltage and outputting a substantially constant voltage;

inverting means, including an input terminal, for generating a rectangular wave voltage for driving a discharge tube in response to the substantially constant voltage output from said rectifying means;

starting means for starting the discharge tube in response to the rectangular wave voltage;

a bypass capacitor having a first terminal connected to an electrode of the discharge tube and a second terminal connected to the input terminal of the inverting means, for bypassing said rectifying means and supplying higher harmonics and a high frequency current flowing through electrodes of the discharge tube, after starting of the discharge tube, to the input terminal of said inverting means; and a smoothing capacitor having a first terminal connected to the second terminal of the bypass capacitor and the second terminal connected to ground whereby the bypass capacitor decreases the total harmonic distortion of the ballast circuit to no more than about eighteen percent.

2. The ballast circuit for a fluorescent lamp as claimed in claim 1, wherein said rectifying means comprises four diodes configured as a full-wave bridge and an electrolytic capacitor for smoothing a voltage rectified by said diodes.

3. The ballast circuit for a fluorescent lamp as claimed in claim 1, wherein said inverting means comprises:

oscillating means for generating an oscillating signal in response to the substantially constant voltage output from said rectifying means; and switching means for generating the rectangular wave voltage by switching the substantially constant voltage on and off in response to the oscillating signal.

4. The ballast circuit for a fluorescent lamp as claimed in claim 3, wherein said switching means comprises two cascaded transistors.

5. The ballast circuit for a fluorescent lamp as claimed in claim 1, comprising an LC resonant circuit including a choke coil for changing the rectangular wave voltage into a sinusoidal voltage and a capacitor connected in series with said choke coil between said inverting means and one of the electrodes of the discharge tube.

6. The ballast circuit for a fluorescent lamp as claimed in claim 1, wherein said starting means comprises a starting capacitor and a positive thermal coefficient resistor connected parallel to the electrodes of the discharge tube.

7. The ballast circuit for a fluorescent lamp as claimed in claim 1, wherein said rectifying means includes an input node and an output node and the first terminal of said bypass capacitor is connected to the input node and the second terminal of said bypass capacitor is connected to the output node.

8. The ballast circuit for a fluorescent lamp as claimed in claim 2, wherein said bypass capacitor is connected in parallel with one of said diodes.

9. The ballast circuit according to claim 1 wherein the high frequency current flows from are of the electrodes of the discharge tube, through the bypass capacitor, to the smoothing capacitor.

10. The ballast circuit according to claim 8 wherein the smoothing capacitor smooths the high frequency current.

11. A ballast circuit for a fluorescent lamp including a discharge tube having two heatable electrodes separated from each other, said circuit comprising:

rectifying means for rectifying an applied AC voltage and outputting a substantially constant voltage;

inverting means, including an input terminal, for generating a rectangular wave voltage for driving a discharge tube in response to the substantially constant voltage output from said rectifying means;

starting means for starting the discharge tube in response to the rectangular wave voltage;

a bypass capacitor having a first terminal connected to an electrode of the discharge tube and a second terminal connected to the input terminal of the inverting means, for bypassing said rectifying means and supplying higher harmonics and a high frequency current flowing through electrodes of the discharge tube, after starting of the discharge tube, to the input terminal of said inverting means; and a smoothing capacitor having a first terminal connected to the second terminal of the bypass capacitor and a second terminal connected to ground.

12. The ballast circuit according to claim 11 wherein the high frequency current flows from one of the electrodes of the discharge tube, through the bypass capacitor, to the smoothing capacitor.

13. The ballast circuit according to claim 12 wherein the smoothing capacitor smooths the high frequency current.

* * * * *